United States Patent [19]

Rowell

[11] Patent Number: 5,021,290

[45] Date of Patent: Jun. 4, 1991

[54] VINYL BASED COATINGS FOR FOAMED MATERIALS

[75] Inventor: Richard T. Rowell, Wickliffe, Ohio

[73] Assignee: Continental Products Company, Euclid, Ohio

[21] Appl. No.: 498,841

[22] Filed: Mar. 26, 1990

[51] Int. Cl.$^5$ .................... B32B 27/30; B32B 27/40; C08J 9/00
[52] U.S. Cl. ........................ 428/319.3; 428/319.7; 521/53; 521/54
[58] Field of Search .................. 428/319.3, 319.7; 521/53, 54

[56] References Cited

U.S. PATENT DOCUMENTS 3,061,460 10/1962 Schickedang ..................... 521/54

Primary Examiner—William J. Van Balen
Attorney, Agent, or Firm—Fay, Sharpe, Beall, Fagan, Minnich & McKee

[57] ABSTRACT

The present invention relates to novel coating compositions for use on preformed foam products, comprising an aqueous admixture of a PVC copolymer dispersion and a polyurethane dispersion together with suitable additives as wetting agents, pigments dispersants, fillers and the like. The coating compositions may be applied by dipping, spraying, or any other suitable application means well known to those skilled in the art.

14 Claims, No Drawings

VINYL BASED COATINGS FOR FOAMED MATERIALS

BACKGROUND OF THE INVENTION

The present invention relates to a novel coating and coated plastic or foam composites, the method of obtaining such coated composites and novel coating compositions for application to foam and plastic substrates to produce such composites.

A wide variety of coating applications exist for foam products and elements in fields as diverse as medicine and sports recreation, industrial applications, flotation applications and the like from foam protective devices such as knee pads and elbow pads to large foam floor mats for wrestling and other gymnasium activities. In many of these applications it is desirable to reduce the surface friction or drag between the foam and the clothing or skin of the patient or athlete. It is also desirable to render the surface of the protective device or mat more durable and also more sanitary, resistant to the absorption of solvents and the like and/or more readily cleanable. It is most desirable to provide the coating using a non-flammable coating composition.

One solution which has been attempted in such applications is the use of a coating over the foamed device or mat. Unfortunately, coatings available in the past have had problems whether they were based on a solvent based system or water based system. The solvent in solvent based systems were absorbed by the foam, causing shrinking of the foam to which they were applied, deterioration of the cellular structure of the foam and in almost every case raise serious EPA and/or OSHA compliance problems Attempts at water based systems avoided the EPA and OSHA problems but still left a heavy undesirable tacky surface and problems with flexibility.

It is one object of the present invention to provide a novel coating composition for plastic and foam objects.

It is another object of the present invention to provide a coating for plastic and foam objects which will provide a quick drying tack free surface on the substrate.

It is still a further objective of the present invention to provide a coating apparatus wherein the coating composition is non-flammable.

It is yet another object of the present invention to provide a novel coating composition for plastic and foam objects wherein the coating has substantially improved coating coverage.

It is yet a further object of the present invention to provide a novel coating composition for plastic foam objects having more desirable toxicity characteristics which can be applied and cured without any failure in compliance with local state and/or federal environmental laws and regulations.

It is yet a still further object of the present invention to provide a novel coating which on application does not cause shrinking of the foam or other deterioration effects.

It is yet still another object of the present invention to provide a novel coating for preformed foam objects wherein the coated foam object can be employed for its intended purpose within as little as 24 hours of application of the coating to the formed substrate.

It is a yet still further object of the present invention to provide an improved coated foam device.

SUMMARY OF THE INVENTION

The novel coating composition of the present invention comprises an aqueous admixture of a PVC copolymer dispersion and a polyurethane dispersion together with suitable additives including by way of illustration and not by way of limitation, wetting agents, pigments dispersants, fillers and the like. The coating compositions may be applied by dipping, spraying, or any other suitable application means well known to those skilled in the art.

As used herein the term "preformed" shall be understood to mean a polymer foam structure having an intermediate or final configuration for use by itself, in conjunction with other elements, and/or for use in producing a final configuration after additional chemical or mechanical forming steps. Also, as used herein "environmently compliant" shall be understood to mean compositions, ingredients, effluants, vapors and the like in compliance with all known present standards set by EPA, OSHA, and other federal agencies or their state or local counterparts.

It was earlier noted that the compositions of the present invention provide an improved tack free surface, as compared to other water based coating compositions. Using gymnasium mats, it has been found that using the compositions of the present invention provided equal or better results then present commercial MEK based systems. Using MEK, 250 to 300 gals. of coating composition, and a 45 by 45 foot mat must be employed to obtain a standard 40 by 40 foot mat because of a 10% minimum shrinking caused by the MEK, and the mat cannot be employed for weeks, until the residual MEK has evaporated.

Using the compositions of the present invention, only 80 to 100 gals of coating composition are required, there is no shrinking, and the mats can be used almost immediately. In the case of football helmet liners, it takes over a month for all MEK to dissipate during which there is frequently solvent damage to the liner and/or the container.

PREFERRED EMBODIMENT

The novel coating composition of the present invention consists essentially of an admixture of from about 10 to about 90, preferably 25 to 75, mole percent of an aqueous PVC copolymer dispersion, from about 10 to about 90, preferably 25 to 75, mole percent of a polyester based polyurethane polymer having a pH in the range of from about 7.5 to about 10 and a Mill dispersion viscosity in the range of from about 60 to about 143 KU's @77° F. In addition, the compositions of the present invention may contain suitable additives and/or processing aids such as the polymers, wetting agents, dispersants, pigments, fillers and the like, and sufficient metal hydroxide or other base to adjust the pH to the desired range. The compositions also contain from about 25 to about 75% by weight of water.

The novel compositions of the present invention are prepared by mixing or grinding the additives to be employed such as suitable pigments and fillers, along with any processing aids, particularly viscosity adjusting materials. An aqueous vinyl latex is separately mixed with any necessary defoamer and sufficient base to adjust the pH to a range of from about 7.5 to about 10 and after sufficient agitation, the first mixture of additives is added to the vinyl chloride latex mixture further agitated and then the polyurethane resin is added to the mixing tank and the entire composition is further agitated until a stable dispersion is obtained.

In general, the compositions of the present invention should contain from about 2 to about 5 parts by weight of water, from about ½ about 1 part by weight of an anionic surfactant, and from 0 to about 1 part by weight of various other dispersants, defoamers and other processing aids. From about 0 to about 30 parts by weight of pigment, from about 0 to about 20 parts by weight of filler, and optionally from about 0 to about 5 parts by weight of amorphous silica may be added to the foregoing aqueous mixture with agitation. Mixing is followed by dispersement of the pigments in a suitable mill or grinding apparatus to provide a pigment paste which may require the addition of from about 3 to about 10 parts by weight of water and from 0 to about 4 parts by weight of additional processing aids such as Methocel or viscosity adjusting aids.

The specific grinding techniques employed in the dispersion of the pigment and/or filler into the paste are not per se critical and the techniques are those generally well known to those skilled in the art for producing aqueous or solvent pastes of pigments and/or fillers for use in paints and plastics. In addition, while aqueous dispersion is to be preferred, other grinding media solvents could be employed particularly environmentally acceptable alcohols and the like.

The vinyl latex is present in the range of from about 15 to about 45 parts by weight and comprises a dispersion of vinyl latex containing from about 20 to about 70% by weight solids and the urethane component is present in the range of from about 15 to about 50 parts by weight and comprises from about 20 to about 70% by weight solids. Additional ingredients, in particular, commercially ground pigments, colors and the like can also be added after preparation of the coating dispersion.

The following examples will serve by way of illustration not by way of limitation to describe specific compositions within in the scope of the present invention.

EXAMPLE 1

15.21 parts by weight of water, 12.12 parts by weight of 30% Pluronic F-87 (a non-ionic surfactant based on block copolymer of ethylene oxide and propylene oxide, manufactured and sold by BASF Corporation), 12.93 parts by weight of a 2.5% solution of Methocel J12MS, 2.1 parts by weight of Drewplus L-475 (a foam control agent containing silica and aliphatic petroleum distillates manufactured and sold by the Drew Industrial Division of Ashland Chemical Company), and 4.42 parts by weight of Silwet L-7607 (an organo silicone fluid surfactant containing at least 99% polyalkalyeneoxide modified polydimethyl siloxane and generally less than about 0.5% toluene manufactured and sold by the Union Carbide Corporation) were premixed for 5 minutes and 4.45 parts by weight of Aerosil R-972 (99.8% $SiO_2$ product manufactured and sold by Degussa Corporation) were added under strong agitation to disperse to a 7A plus grind on Norse Standard Grind Gauge (about 10 minutes) using, as needed, portions from 45.42 parts by weight of water the remainder of which was added at the end of the grind. In separate mixing equipment, 356.66 parts by weight of Geon 460X46 (a vinyl chloride acrylic copolymer in a water based latex containing a synthetic anionic emulsifier, manufactured and sold by the B. F. Goodrich Chemical Company) and 2.39 parts by weight of Drewplus Y-281 (another foam control agent manufactured by the Drew Industrial Division of Ashland Chemical Company comprising primarily aliphatic petroleum distolates containing silica and silicon dioxide and a surfactant) followed by 5 minutes of mixing after which, 0.71 parts by weight of ammonia were added to adjust the pH to above 8.5 after which the previously described premix grind (which had been permitted to cool to a temperature below 120° F.) was added to the latex premixture. 2.72 parts by weight of Acrysol RM-825 thickening agent (containing a polyurethane resin, diethylene glycol monobutylether and water, manufactured and sold by Rohm and Haas Company) followed by 5 minutes of mixing, and then the addition of 436.91 parts by weight of Urethane U66 (a polyester based aliphatic urethane latex in water also containing an internally polymerically stabilized emulsifier, manufactured and sold by B. F. Goodrich Company) again followed by mixing for approximately 5 minutes and the addition of 4.04 parts by weight of polyphase AF-1 (Mfg. by Troy Chemical Co.—3-lodo-2-propynyl-butyl carbamate). The entire mixture was agitated for an additional 5 minutes after which 1.19 parts by weight of ammonium hydroxide were added to adjust the pH to betWeen 8.5 and 9.0, and the entire mixture was then agitated for an additional 15 to 20 minutes to provide a stable clear water born vinyl coating which did not flash, having a full body viscosity of 45 to 55 seconds, at 77° F. in a No. 2 Zahn cup (with a preferred application viscosity of 30 to 40 seconds in a No. 2 Zahn cup) a gloss range of 85°+ on a 60° angle gloss unit at 1.4 to 1.5 mils, and 41% by weight (36.2% by volume) solids. When applied to a foam substrate by dipping the coating air dried tack free in 30 to 40 minutes, and provided a hard dry overnight under normal ambient conditions.

EXAMPLE 2

Another coating composition was prepared in a manner similar to that set forth in Example 1 using the following ingredients and amounts:

| RAW MATERIAL | TOTAL WEIGHT |
|---|---|
| Water | 29.39 |
| Pluronic F-87 | 2.47 |
| Polywet ND-2 (1) | 3.39 |
| Disperse AYD W-22 (2) | 4.21 |
| Drewplus L-475 Defoamer | 3.03 |
| Silwet L-7607 | 5.04 |
| DuPont Tipure R-900 ($TiO_2$) | 194.83 |
| Aerosil R-972 | 4.93 |
| 2.5% Solution Methocel J12MS | 12.18 |
| Water | 68.39 |
| Geon 460X46 (49%) | 347.22 |
| Drewplus Y-281 Defoamer | 2.06 |
| Ammonium Hydroxide | .31 |
| Acrysol RM-825 (25%) | 2.79 |
| Urethane U66 (40%) | 361.86 |
| | 1042.10 |

EXAMPLE 3

A still further composition was prepared in the manner set forth in Example 1 employing the following ingredients and amounts.

| RAW MATERIAL | TOTAL WEIGHT |
|---|---|
| Water | 23.46 |
| Pluronic F-87 | 7.89 |
| Polywet ND-2 (1) | 3.25 |

| RAW MATERIAL | TOTAL WEIGHT |
| --- | --- |
| Disperse AYD W-22 (2) | 4.24 |
| Drewplus L-475 Defoamer | 3.15 |
| Silwet L-7607 | 5.82 |
| Dupont Tipure R-900 (TiO$_2$) | 179.82 |
| Imsil A-108 (3) | 98.59 |
| Aerosil R-972 | 5.33 |
| OK 412 (4) | 7.39 |
| 2.5% Solution Methocel J12MS | 11.63 |
| Water | 64.77 |
| Acrysol RM-825 (25%) | 3.45 |
| Geon 460X46 (49%) | 328.89 |
| Drewplus Y-281 Defoamer | 2.71 |
| Ammonium Hydroxide | .30 |
| Urethane U66 (40%) | 342.79 |
| | 1093.48 |

(1) A dispersant for TiO$_2$ in latex emulsions manufactured and sold by Uniroyal Chemicals Division of Uniroyal Inc. and comprising a 25% aqueous sodium salt of a functionalized acrylic oligomer.
(2) An anionic/non-ionic surfactant and dispersing agent manufactured and sold by Daniels Products Company, Jersey City, New Jersey.
(3) Silicon dioxide - microcrystalline silica manufactured and sold by Illinois Minerals Company.
(4) A wax coated amorphous silica flatting agent manufactured and sold by Degussa Corp.

EXAMPLE 4

A still further composition was prepared in the manner set forth in Example 1 employing the following ingredients and amounts.

| RAW MATERIAL | TOTAL WEIGHT |
| --- | --- |
| Water | 14.61 |
| 30% Solution Pluronic F-87 | 11.67 |
| 2.5% Solution Methocel J12MS | 12.45 |
| Drewplus L-475 Defoamer | 2.02 |
| Silwet L-7607 | 4.25 |
| Aerosil R-972 | 4.28 |
| Water | 43.73 |
| Geon 460X46 (49%) | 343.36 |
| Drewplus Y-281 Defoamer | 2.30 |
| Ammonium Hydroxide | .68 |
| Urethane U66 (40%) | 420.62 |
| Polyphase AF-1 (40%) | 3.89 |
| Ammonium Hydroxide | 1.15 |
| 13-3077 Aquanyl Red FRR-A (5) | 34.72 |
| Acrysol RM-825 (25%) | 2.61 |
| | 902.37 |

(5) An azo compound - PIGMENT RED 2 in aqueous dispersion manufactured and sold by Hoechst Celanese Corporation.

The viscosities described herein are to facilitate dipping or commercial spray application techniques and equipment. It will be understood that higher or lower viscosities may be desireable or even necessary using alternative techniques and/or equipment. Also, while the samples in the various examples were air dried, force drying techniques and/or equipment, or slightly elevated temperatures may obviously be employed.

A number of additional experiments were conducted employing varying ratios of vinyl to urethane polymer and substituting other wetting agents, pigments processing aids and the like. In every case, the resulting product was a coating which can be readily applied by dipping, spraying or any other suitable application technique. In at least one case the coating was sprayed onto the inner surface of a mold prior to injection of the foam precursor and the resultant coating was excellent.

While Ensolite closed cell urethane foams (manufactured and sold by Uniroyal) were employed for comparative testing purposes, the coatings of the present invention were successfully applied to a wide variety of foam substrates including other urethane foams, vinyl based foams, and rubber foams, both rigid and flexible. In every case there was excellent adhesion/cohesion (non-cracking) of the coating to the substrate even after heavy flexing cycles.

The compositions of the present invention also provide a substantial and highly unexpected reduction in the overall cost of coating. The theoretical coverage per gallon of the composition of the present invention is from approximately 175 to approximately 300 sq. ft. per gallon or more. Whereas the compositions previously used in a coating mat such as those used for scholastic gymnasiums and the like had a coverage of generally about 16 to 50 sq. ft. per gallon to provide an effective coating. In addition to a substantial reduction in cost, mats coated with the compositions of the present invention are much more readily cleaned, and are sanitizable which can eliminate heretofore significant problems such as impetigo associated with conventional canvas mats.

For convenience, gymnasium mats have been used for ease of description and application. The compositions of the present invention have utility with any foamed substrate. In addition to the utility in conjunction with coating large foam mats and the like, the coating compositions of the present invention have application in a wide variety of other preformed foam products, more particularly though by no means exclusively of the type employed in flotation devices, medical applications and in athletic endeavors, such as knee pads, shoulder pads, linings for prosthetic devices and the like. In all these applications, the substrate coated with the novel compositions of the present invention appear to provide a substantial reduction in the drag or coefficient of friction between the surface of the coated foam and clothing on human skin, thereby substantially reducing the potential for injury to contestants in gymnastic and other sporting events and/or easing the discomfort associated with the use of medical devices etc.

It will, of course, be obvious to those skilled in the art that a wide variety of substitutions and changes can be made in the ingredients and procedures employed to prepare the novel compositions of the present invention and that the present invention is limited only by the scope of the appended claims.

I claim:

1. A coating composition for foam substrates consisting of an admixture of about 10 to about 90 mole percent of an aqueous PVC copolymer dispersion, from about 10 to about 90 moles percent of an aqueous polyester based polyurethane polymer dispersion, and suitable wetting agents, pigments, dispersants, fillers viscosity adjuvants and foam control agents, said coating composition having a pH in the range of from about 7.5 to about 10.

2. The coating composition of claim 1 wherein said vinyl copolymer dispersion and said polyurethane dispersion are each present in the range of from about 25 to about 75 mole percent and said composition has a mill dispersion viscosity in the range of from about 60 to about 143 KU's @77° F.

3. A product suitable for use in medical and athletic applications comprising a foam substrate having a predetermined configuration and having a coating on the surface thereof said coating consisting essentially of an admixture of about 10 to about 90 mole percent of an aqueous PVC copolymer dispersion, from about 10 to about 90 moles percent of an aqueous polyester based polyurethane polymer dispersion, and suitable wetting agents, pigments, dispersants, fillers, viscosity adjuvants and foam control agents, said coating composition having a pH in the range of from about 7.5 to about 10.

4. The product according to claim 3 wherein said vinyl copolymer dispersion and said polyurethane dispersion are each present in the range of from about 25 to 75 mole percent.

5. The product of claim 3 wherein said coating composition has a mill dispersion viscosity of in the range of from about 60 to 143 Ku's @77° F.

6. The product of claim 4 wherein aid coating composition has a mill dispersion viscosity of in the range of from about 60 to 143 Ku's @77° F.

7. The product of claim 3 wherein said foam is a PVC foam.

8. The product of claim 5 wherein said foam is a PVC foam.

9. The product of claim 3 wherein said foam is a polyurethane foam.

10. The product of claim 5 wherein said foam is a polyurethane foam.

11. The product of claim 3 wherein said foam is a rubber foam.

12. The product of claim 5 wherein said foam is a rubber foam.

13. The product of claim 3 wherein said foam is a PVC copolymer foam.

14. The product of claim 5 wherein said foam is a PVC copolymer foam.

* * * * *